(12) United States Patent
Kii et al.

(10) Patent No.: US 8,357,260 B2
(45) Date of Patent: Jan. 22, 2013

(54) PARTIALLY CROSSLINKED ADHESIVE-SUPPORTED POROUS FILM FOR BATTERY SEPARATOR AND ITS USE

(75) Inventors: Keisuke Kii, Ibaraki (JP); Michio Satsuma, Ibaraki (JP); Yoshihiro Uetani, Ibaraki (JP); Mutsuko Yamaguchi, Ibaraki (JP); Yutaka Kishii, Ibaraki (JP); Shuuhei Murata, Ibaraki (JP); Tomoaki Ichikawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/218,572

(22) Filed: Aug. 26, 2011

(65) Prior Publication Data

US 2011/0308727 A1   Dec. 22, 2011

Related U.S. Application Data

(62) Division of application No. 10/698,438, filed on Nov. 3, 2003, now abandoned.

(30) Foreign Application Priority Data

| Nov. 13, 2002 | (JP) | 2002-330003 |
| Mar. 18, 2003 | (JP) | 2003-073237 |
| Aug. 11, 2003 | (JP) | 2003-207042 |

(51) Int. Cl.
*H01M 4/82* (2006.01)
*H01M 6/00* (2006.01)
*H01M 2/16* (2006.01)
*C04B 37/00* (2006.01)

(52) U.S. Cl. ............... 156/325; 29/623.1; 429/253

(58) Field of Classification Search ............ 29/623.1; 156/325; 429/253
See application file for complete search history.

(56) References Cited

U.S. PATENT DOCUMENTS

| 5,731,074 A | 3/1998 | Nishiyama et al. |
| 6,096,456 A * | 8/2000 | Takeuchi et al. ........ 429/249 |
| 6,132,904 A | 10/2000 | Kamino et al. |
| 2003/0064282 A1 | 4/2003 | Nakagawa et al. |
| 2003/0215704 A1 | 11/2003 | Satsuma et al. |

FOREIGN PATENT DOCUMENTS

| EP | 0 563 773 A1 | 10/1993 |
| EP | 0 668 156 A1 | 8/1995 |
| EP | 0 798 791 A2 | 10/1997 |
| EP | 0 813 979 A2 | 12/1997 |
| EP | 1 365 461 A2 | 11/2003 |
| JP | 5-310989 A | 11/1993 |
| JP | 07-010957 A | 1/1995 |
| JP | 9-12756 A | 1/1997 |
| JP | 9-161814 A | 6/1997 |
| JP | 10-172606 A | 6/1998 |
| JP | 10-183085 A | 7/1998 |
| JP | 11-329439 A | 11/1999 |
| JP | 2002-522872 A | 7/2002 |
| JP | 2003-155455 A | 5/2003 |
| WO | 97/12412 A1 | 4/1997 |
| WO | 00/24068 A1 | 4/2000 |
| WO | 01/75991 A1 | 10/2001 |

OTHER PUBLICATIONS

Japanese Notification of Reasons for Refusal dated Jun. 9, 2009 and translation.
European Office Action, dated Dec. 30, 2010, issued in Application No. 10010392.8.
U.S. Appl. No. 10/422,854, filed Apr. 25, 2003.
European Search Report dated May 4, 2004.
Patent Abstracts of Japan, JP Pub No. 09-161814 Jun. 20, 1997.
Patent Abstracts of Japan, JP Pub No. 10-172606 Jun. 26, 1998.
Patent Abstracts of Japan, JP Pub No. 11-329439 Nov. 30, 1999.
Patent Abstracts of Japan, JP Pub No. 05-310989 Nov. 22, 1993.
Patent Abstracts of Japan, JP Pub No. 09-012756 Jan. 14, 1997.
Office Action issued on Dec. 27, 2010 in counterpart European Application No. 03026012.9.

* cited by examiner

*Primary Examiner* — Michael Orlando
(74) *Attorney, Agent, or Firm* — Sughrue Mion, PLLC

(57) ABSTRACT

A partially crosslinked adhesive-supported porous film for battery separator, which in producing a battery, can effectively produce a battery as an electrode/separator laminate in which an electrode and a separator are temporarily bonded to each other without causing mutual slip movement between the electrode and the separator and which after producing a battery, functions itself as a separator having a small heat shrinkage factor even at high temperatures, and a process of producing a battery using such a partially crosslinked adhesive-supported porous film. The partially crosslinked adhesive-supported porous film for battery separator, includes a porous film substrate having supported thereon a partially crosslinked adhesive that is partially crosslinked by preparing a reactive polymer having a functional group in the molecule and capable of being crosslinked upon reaction with a polyfunctional compound having reactivity with the functional group and then reacting the reactive polymer with a polyfunctional compound.

1 Claim, No Drawings

PARTIALLY CROSSLINKED ADHESIVE-SUPPORTED POROUS FILM FOR BATTERY SEPARATOR AND ITS USE

This a divisional of application Ser. No. 10/698,438 filed Nov. 3, 2003, which claims priority from JP 2002-330003 filed Nov. 13, 2002, JP 2003-073237 filed Mar. 18, 2003, and JP 2003-207042 filed Aug. 11, 2003; the entire disclosures of the prior applications are considered part of the disclosure of the accompanying divisional application and is incorporated herein by reference.

FIELD OF THE INVENTION

The present invention relates to a partially crosslinked adhesive-supported porous film that is not only useful for production of batteries but also able to contribute to safety during use of the thus produced batteries, and a process of producing batteries utilizing the same.

DESCRIPTION OF THE RELATED ART

Conventionally, a method of producing batteries has been known in which a positive electrode and a negative electrode are laminated while sandwiching a separator between the electrodes for the purpose of preventing a short circuit therebetween, or a positive (or negative) electrode, a separator, a negative (or positive) electrode, and a separator are laminated in this order; the laminate is wound up to form an electrode/separator laminate; the electrode/separator laminate is charged into a battery container; and an electrolyte liquid is then pouring into the battery container, following by sealing, as described in, for example, JP-A-09-161814 and JP-A-11-329439.

However, in such a method of producing batteries, the electrode and the separator are liable to cause mutual slip movement during custody or delivery of the electrode/separator laminate. As a result, problems involved such that the productivity of batteries is low and that inferior goods are liable to occur. Further, according to the thus obtained batteries, the electrode blisters or shrinks during the use, whereby adhesiveness between the electrode and the separator becomes worse, leading to reduction in battery characteristics, or an internal short circuit occurs, whereby the battery causes heat generation and temperature rise, leading to even possibility of causing breakage.

On the other hand, especially in the production of laminated batteries, in most of the cases, there is employed a method in which an electrode and a separator are bonded to each other using a polyvinylidene fluoride resin solution as an adhesive, and the solvent used in the resin solution is then removed in vacuum. However, such a method involved problems such that not only the steps are complicated, but also the quality of the resulting products becomes hardly stable, and bonding between the electrode and the separator is not sufficient (see, for example, JP-A-10-172606).

With respect to porous films for battery separator, various production methods have hitherto been known. As one of the production methods, a method is known in which a sheet made of a polyolefin resin is produced and stretched in a high stretching ratio (see, for example, JP-A-09-012756). However, such a battery separator made of a porous film obtained by stretching in a high ratio markedly shrinks under a high-temperature environment such as the case where the battery causes an abnormal temperature rise by an internal short circuit, etc., and according to circumstances, there is a problem such that the battery separator does not function as a diaphragm between electrodes.

In order to improve safety of batteries, it is an important issue to reduce a heat shrinkage factor of the battery separator under such a high-temperature environment. As to this issue, in order to control the heat shrinkage of the battery separator under a high-temperature environment, there is, for example, known a method in which an ultrahigh molecular weight polyethylene and a plasticizer are melt kneaded, the mixture is extruded in a sheet form from a die, and the plasticizer is then extracted and removed to produce a porous film to be used as a battery separator (see JP-A-05-310989). However, contrary to the above-described method, this method does not employ stretching, and therefore, the resulting porous film involves a problem such that the strength is not sufficient.

SUMMARY OF THE INVENTION

The present invention has been made to overcome the problems in the conventional production of batteries.

One object of the present invention is to provide a partially crosslinked adhesive-supported porous film for battery separator, which in producing a battery, can effectively produce a battery as an electrode/separator laminate comprising an electrode and a separator temporarily bonded to each other without causing mutual slip movement between the electrode and the separator and which after producing a battery, functions itself as a separator having a small heat shrinkage factor even at high temperatures.

Another object of the present invention is to provide a process of producing a battery using such a partially crosslinked adhesive-supported porous film.

According to the present invention, there is provided a partially crosslinked adhesive-supported porous film for battery separator, comprising a porous film substrate having supported thereon a partially crosslinked adhesive that is partially crosslinked by preparing a reactive polymer having a functional group in the molecule and capable of being crosslinked upon reaction with a polyfunctional compound having reactivity with the functional group and then reacting the reactive polymer with a polyfunctional compound.

According to the present invention, there is provided an electrode/porous film laminate comprising the partially crosslinked adhesive-supported porous film and an electrode laminated thereon and contact bonded thereto.

According to the present invention, there is provided an electrode/porous film junction body, prepared by further crosslinking the partially crosslinked adhesive in the electrode/porous film laminate upon reaction of the unreacted functional group in the reactive polymer and the polyfunctional compound and bonding an electrode to the porous film.

According to the present invention, there is provided a process of producing a battery, which comprises forming the electrode/porous film laminate; and after charging the electrode/porous film laminate into a battery container, pouring an electrolyte liquid containing the polyfunctional compound into the battery container and heating it to react the unreacted functional group in the reactive polymer with the polyfunctional compound, thereby further crosslinking the partially crosslinked adhesive supported on the porous film and bonding the electrode to the porous film to form an electrode/porous film junction body and obtain a battery having as a separator the porous film in the electrode/porous film junction body.

DETAILED DESCRIPTION OF THE INVENTION

The reactive polymer as referred to herein means a polymer having a functional group in the molecule and capable of being crosslinked upon reaction with a polyfunctional compound having reactivity with the functional group. The crosslinkable adhesive as referred to herein means a composition comprising a mixture of the reactive polymer and a polyfunctional compound. Further, the partially crosslinked adhesive means one in which in the crosslinkable adhesive, the reactive polymer is partially crosslinked upon reaction of the polyfunctional compound.

The electrode/porous film laminate as referred to herein means one comprising the partially crosslinked adhesive-supported porous film and an electrode contact bonded, temporarily bonded and laminated to each other. The electrode/porous film junction body as referred to herein means one in which in the porous film laminate, the partially crosslinked adhesive is further reacted and crosslinked with the polyfunctional compound, thereby joining the electrode to the porous film.

The porous film substrate functions as a separator after the production of a battery, and hence, is desired to have a film thickness in the range of from 3 to 100 μm. When the film thickness is less than 3 μm, the strength is insufficient so that in the case where the porous film substrate is used as the separator in the battery, an internal short circuit may possibly occur. On the other hand, when it exceeds 100 μm, a distance between the electrodes is too large so that an internal resistance becomes excessive. Especially it is preferable that the porous film substrate has a film thickness in the range of from 5 to 50 μm. Further, it is desired that the porous film substrate has pores having a mean pore size of from 0.01 to 5 μm.

The porous film substrate is not particularly limited so far as it has the above-described characteristics. However, taking into consideration resistance to solvents and resistance to oxidation and reduction, porous films made of a polyolefin resin such as polyethylene and polypropylene are suitable. Above all, polyethylene is especially suitable as the porous film substrate because when heated, the resin is melted to plug pores, thereby enabling a battery to have a so-called shutdown function. The polyethylene includes not only a homopolymer of ethylene but also copolymers of ethylene and an α-olefin such as propylene, butene, and hexene. However, according to the present invention, laminated films of a porous film of polytetrafluoroethylene, a polyimide, etc., and the above polyolefin resin porous film are also suitably used as the porous film substrate because they are excellent in heat resistance.

The partially crosslinked adhesive-supported porous film for battery separator comprises a porous film substrate having supported thereon a partially crosslinked adhesive that is partially crosslinked by preparing a reactive polymer having a functional group in the molecule and capable of being crosslinked upon reaction with a polyfunctional compound having reactivity with the functional group and then reacting the reactive polymer with a polyfunctional compound. As described hereinafter, it is desired that such a partially crosslinked adhesive has a gel fraction in the prescribed range.

The reactive polymer is not particularly limited so far as it has a functional group in the molecule and can be crosslinked upon reaction with a polyfunctional compound having reactivity with the functional group. As the polyfunctional compound, polyfunctional isocyanate compounds and polyfunctional epoxy compounds can be enumerated as preferred specific examples. Accordingly, as the functional group that the reaction polymer has, active hydrogen-containing functional groups capable of reacting with an isocyanate group or an epoxy group, such as a hydroxyl group, a carboxyl group or an amino group, are preferable.

When such a reactive polymer has a hydroxyl group, a carboxyl group or an amino group as the functional group, by reacting the reactive polymer with a prescribed amount of a polyfunctional isocyanate compound or a polyfunctional epoxy compound under a prescribed condition, it is possible to control crosslinking reaction of the reactive polymer, thereby crosslinking a part thereof. The partially crosslinked reactive polymer is supported as a partially crosslinked adhesive on the porous film, whereby the partially crosslinked adhesive-supported porous film is obtained.

The reactive polymer usually has a glass transition temperature in the range of from −30° C. to 100° C., and preferably from 0° C. to 80° C. That is, in the partially crosslinked adhesive-supported porous film, the reactive polymer having the above glass transition temperature is partially crosslinked to form a partially crosslinked adhesive, which is then supported. When such a partially crosslinked adhesive-supported porous film is used, the partially crosslinked adhesive is optionally heated at a proper temperature, and an electrode is then contact bonded to the porous film, whereby the electrode can be easily temporarily bonded.

Especially, in a porous film having supported thereon a partially crosslinked adhesive obtained from a reactive polymer whose glass transition temperature is the normal temperature or higher, since the partially crosslinked adhesive does not have tackiness at the normal temperature, even when the partially crosslinked adhesive-supported porous film is overlaid or wound up, it does not cause blocking. Further, for example, in the case where the porous film having a partially crosslinked adhesive supported thereon is guided into a winding machine and laminated on an electrode to obtain a laminate, the porous film is free from the matter that it is adhered on a roll guide and taken up by the roll guide.

Besides, in a porous film having supported thereon a partially crosslinked adhesive obtained from a reactive polymer whose glass transition temperature is the normal temperature or higher, in the case where this porous film and an electrode are laminated and wound up to form a winding material, i.e., a winding material of a separator/electrode laminate, it is excellent in so-called pin-extracting properties and hence, is advantageous. In order to obtain a winding material by laminating the partially crosslinked adhesive-supported porous film and the electrode and winding up the laminate, in general, the porous film and the electrode are laminated, the terminal ends of the laminate are pinched by a forked metallic pin, and the pin is rotated to form a winding material comprising the laminate of the porous film and the electrode around the pin. When the porous film and the electrode are wound up over a required length, the end terminal of the resulting winding material is cut, a porous film is then wound up and fixed around the winding material, and the pin is extracted from the winding material to obtain the winding material of separator/electrode laminate. Since the partially crosslinked adhesive-supported porous film obtained from a reactive polymer whose glass transition temperature is the normal temperature or higher does not have tackiness at the normal temperature, the pin can be easily extracted from the resulting winding material. That is, the partially crosslinked adhesive-supported porous film is excellent in pin-extracting properties.

According to the present invention, by laminating an electrode on the partially crosslinked adhesive-supported porous film and contact bonding them optionally upon heating as describe previously, it is possible to obtain an electrode/porous film laminate by temporarily bonding the electrode to the porous film and laminating them. For example, in the case where a porous film made of a polyolefin resin such as a polyethylene resin is used as the porous film, it is possible to obtain an electrode/porous film by contact bonding an electrode while heating at a temperature at which the porous film causes neither deformation nor change of properties, for example, at a temperature in the range of from 50 to 100° C., temporarily boning the electrode, and laminating it to the porous film.

Even when such an electrode/porous film laminate is brought into contact with an electrolyte liquid during production of batteries, it is possible to effectively use a partially crosslinked adhesive (partially crosslinked reactive polymer) for bonding a porous film to an electrode by preventing or reducing dissolution of the partially crosslinked adhesive (partially crosslinked reactive polymer) into the electrolyte liquid, and thus, it is possible to more firmly bond the electrode to the porous film.

The reactive polymer can be obtained by, for example, subjecting a copolymerizable monomer containing the functional group and other copolymerizable monomer not containing such a functional group to usual radical copolymerization such as solution polymerization, block polymerization, and emulsion polymerization. The functional group-containing copolymerizable monomer is usually used in an amount in the range of from 0.1 to 20% by weight, and preferably from 0.1 to 10% by weight of the whole of the monomers.

Examples of copolymerizable monomers containing a carboxyl group as the functional group include (meth)acrylic acid, itaconic acid, and maleic acid. Examples of copolymerizable monomers containing a hydroxyl group as the functional group include hydroxyalkyl (meth)acrylates such as 2-hydroxyethyl (meth)acrylate, 2-hydroxypropyl (meth)acrylate or 4-hydroxybutyl acrylate. Examples of copolymerizable monomers containing an amino group as the functional group include a reaction product of a diamine and (meth)acryloyloxyethyl isocyanate (1:1). Above all, acrylic monomers such as (meth)acrylic acid or hydroxyalkyl (meth)acrylates are preferably used.

On the other hand, examples of functional group-free copolymerizable monomers include (meth)acrylic monomers such as (meth)acrylic acid esters, (meth)acrylamides or (meth)acrylonitriles and various vinyl monomers such as styrene, vinyl acetate or N-vinylpyrrolidone.

Examples of the (meth)acrylic acid esters that are preferably used include alkyl esters in which the alkyl moiety thereof has from 1 to 12 carbon atoms, such as ethyl (meth)acrylate, butyl (meth)acrylate, propyl (meth)acrylate, isooctyl (meth)acrylate, 2-ethylhexyl (meth)acrylate or dodecyl (meth)acrylate.

Besides, when it is required to increase the glass transition temperature of the resulting reactive polymer, (meth)acrylic acid esters in which a homopolymer thereof has a glass transition temperature of normal temperature (23° C.) or higher, such as (meth)acrylic acid isobornyl ester, dicyclopentenyl ester or tetrahydrofufuryl ester, (meth)acrylic acid esters containing a cyclic hydrocarbon group such as a benzyl group or a cyclohexyl group in the molecule, and imide (meth)acrylates containing a highly polar group such as an imide group, are suitably used.

Examples of the (meth)acrylamides include N,N-dimethyl (meth)acrylamide, N,N-diethyl (meth)acrylamide, N,N-di-n-propyl (meth)acrylamide, N,N-diisopropyl (meth)acrylamide, N-(meth)acryloylmorpholine, N-(meth)acryloylpyrrolidone, N-(meth)acryloylpiperidine, and N-(meth)acryloylpyrrolidine.

In particular, preferred examples of the reactive polymer include reactive polymers comprising the functional group-containing acrylic monomer component and an acrylic monomer component such as (meth)acrylic acid esters, (meth)acrylonitriles or (meth)acrylamides. For example, a reactive polymer having a (meth)acrylonitrile component in an amount of up to 80% by weight, and preferably in the range of from 5 to 70% by weight is one example of the preferred reactive polymer to be used in the present invention because it is excellent in heat resistance and resistance to solvents. A reactive polymer comprising from 0.1 to 20% by weight of a functional group-containing monomer component, from 10 to 95% by weight of a (meth)acrylic acid ester component, and from 4.9 to 60% by weight of a (meth)acrylonitrile is one example of the preferred reactive polymer.

However, it should not be construed that the reactive polymer is limited to those described above. Polymers containing the functional group that the reactive polymer has, such as a functional group capable of reacting with an isocyanate group or an epoxy group as described above, such as active hydrogen-containing polymers, may be employed. Examples thereof include polyolefin based polymers, rubber based polymers, polyester based polymers, and polyether based polymers, each containing a functional group capable of reacting with an isocyanate group or an epoxy group. Further, acrylic modified fluorocarbon resins containing a hydroxyl group in the molecule (for example, Cefral Coat FG730B manufactured by Central Glass Co., Ltd., which is available as a varnish) can also be suitably used as the reactive polymer.

The reactive polymer can be obtained as a polymer solution by copolymerizing the required monomers in a solvent such as benzene, toluene, xylene, ethyl acetate, and butyl acetate. On the other hand, since according to the emulsion polymerization process, an aqueous dispersion of the reactive polymer can be obtained, the polymer is separated from the aqueous solution and dried, and then dissolved in the solvent to form a polymer solution. According to the emulsion process, in addition to the above monomers, a polyfunctional crosslinkable monomer such as divinylbenzene and trimethylolpropane triacrylate may be used in a proportion of 1% by weight or less.

Examples of polyfunctional isocyanates include aromatic, araliphatic, alicyclic or aliphatic diisocyanates such as phenylene diisocyanate, tolylene diisocyanate, diphenyl-methane diisocyanate, diphenyl ether diisocyanate, hexamethylene diisocyanate or cyclohexane diisocyanate. So-called isocyanate adducts comprising a polyol (such as trimethylolpropane) having such a diisocyanate added thereto can also be preferably used.

Examples of polyfunctional epoxy compounds include biphenol A type epoxy resins, alicyclic epoxy resins, aliphatic chain epoxy compounds, and phenol novolak type epoxy resins.

The partially crosslinked adhesive-supported porous film for battery separator can be obtained by compounding the reactive polymer solution with the polyfunctional compound in a prescribed amount, i.e., an amount sufficient for partially crosslinking the reactive polymer, to form a crosslinkable adhesive; supporting the adhesive on a porous film substrate; and reacting the reactive polymer with the polyfunctional compound under a prescribed condition, thereby partially crosslinking the reactive polymer and supporting the resulting reactive polymer as a partially crosslinked adhesive on the porous film substrate. Generally, the polyfunctional compound is reacted in an amount of from 0.1 to 10 parts by weight based on 100 parts by weight of the reactive polymer, thereby partially crosslinking the reactive polymer and supporting the resulting reactive polymer as a partially crosslinked adhesive on the porous film substrate, to obtain the partially crosslinked adhesive-supported porous film.

In supporting the partially crosslinked adhesive on the porous film substrate, a method may be employed in which a solution comprising a mixture of the reactive polymer and the polyfunctional compound is coated on the porous film and dried, and then heated to partially crosslink the reactive polymer on the porous film, thereby supporting the partially crosslinked adhesive on the porous film substrate. A method may also be employed in which a solution comprising a mixture of the reactive polymer and the polyfunctional compound is coated on a stretched polypropylene film or a releasable sheet such as release processed paper and dried, and then transferred into the porous film substrate, which is then heated to partially crosslink the reactive polymer on the porous film, thereby supporting the partially crosslinked adhesive on the porous film substrate.

Another method may be employed in which the reactive polymer is added to a solution of the reactive polymer and heated, thereby partially crosslinking the reactive polymer to form a solution of a partially crosslinked adhesive, and the adhesive is coated on the porous film substrate and dried to support the partially crosslinked adhesive on the porous film substrate.

The partially crosslinked adhesive has a gel fraction in the range of from 5 to 99%, preferably from 10 to 95%, more preferably from 15 to 85%, and most preferably from 20 to 80%.

The gel fraction as referred to herein means a value defined by $(C/(A+B)) \times 100(\%)$, wherein A represents the amount (part by weight) of the reactive polymer; B represents the amount (part by weight) of the polyfunctional compound; and C represents the amount (part by weight) of the crosslinkable adhesive remaining on the porous film when the crosslinkable adhesive composed of the reactive polymer and the polyfunctional compound is supported on the porous film and reacted to partially crosslink the reactive polymer, and the resulting porous film is dipped in toluene at a temperature of 23° C. for 7 days and then heated.

The method of obtaining the partially crosslinked adhesive having a gel fraction in the range of from 5 to 99% is not limited. However, as described previously, such a partially crosslinked adhesive can be usually obtained by compounding the polyfunctional compound in an amount in the range of from 0.1 to 10 parts by weight based on 100 parts by weight of the reactive polymer; heating and curing the mixture so as to react the reactive polymer with the polyfunctional compound under a prescribed condition; and continuing the crosslinking reaction until the resulting partially crosslinked reactive polymer (i.e., the partially crosslinked adhesive) becomes stable in terms of characteristics. The heating and curing temperature and time vary depending upon the reactive polymer and polyfunctional compound to be used and the kinds thereof, but these reaction conditions can be determined by experiments. For example, when heating and reaction are carried out at a temperature of 50° C. for 7 days, usually, crosslinking reaction of the reactive polymer with the polyfunctional compound is completed, and the resulting partially crosslinked reactive polymer (partially crosslinked adhesive) becomes stable in terms of characteristics.

The reaction product obtained by partially reacting and crosslinking the reactive polymer upon reaction with the polyfunctional compound, i.e., the partially crosslinked adhesive, is supported on the porous film to form the partially crosslinked adhesive-supported porous film, to which is then contact bonded an electrode preferably upon heating. Thus, the electrode can be easily temporarily bonded to and laminated on the porous film to obtain an electrode/porous film laminate.

When this electrode/porous film laminate is charged into a battery container, and an electrolyte liquid having a polyfunctional compound dissolved therein is poured into the battery container, the unreacted functional group in the reactive polymer in the partially crosslinked adhesive is further crosslinked with the polyfunctional compound in the electrolytic liquid while keeping the temporary bonding state of the electrode/porous film, whereby an electrode/separator junction body in which the electrode is firmly bonded to the porous film with good adhesiveness can be obtained. Further, according to the present invention, the reactive polymer is partially crosslinked so as to have a gel fraction of from 5 to 99%, dissolution of the reactive polymer into the electrolyte liquid is prevented or reduced, and the reactive polymer is effectively used for bonding the electrode to the porous film. Accordingly, the electrode is bonded to the porous film stably and more firmly.

In addition, in the partially crosslinked adhesive-supported porous film, since the reactive polymer does not cause reaction and crosslinkage any more, the partially crosslinked adhesive is stable, and even when stored over a long period of time, does not cause change of properties.

For supporting the crosslinkable adhesive comprising a reactive polymer and a polyfunctional compound on the porous film substrate, for example, there may be employed a method in which the crosslinkable adhesive is directly coated on the porous film substrate and then dried; and a method in which the crosslinkable adhesive is coated on a releasable sheet and dried, and then transferred into the porous film substrate. For improving coating properties of the crosslinkable adhesive onto the porous film substrate, an organic solvent such as methyl ethyl ketone and methyl isobutyl ketone, or an inorganic fine powder such as fine powders of calcium carbonate heavy and silica sand may be compounded in an amount of 50% by weight or less as a fluidity modifier or a filler in the crosslinkable adhesive.

Further, in coating the crosslinkable adhesive comprising a reactive polymer and a polyfunctional compound on the porous film substrate, it is preferable that the adhesive is partially coated, i.e., it is coated in, for example, a ribbed, spotted, grid-like, striped, or hexagonal pattern form. In particular, by coating the crosslinkable adhesive on from 5 to 95% of the area of the porous film substrate on which the adhesive is coated and partially crosslinking the reactive polymer, it is possible to obtain firm bonding between the electrode and the porous film (accordingly, the separator). By using such an electrode/separator junction body, it is possible to obtain a battery having excellent characteristics.

In the present invention, the proportion in which the porous film supports the partially crosslinked adhesive on the surface thereof will be hereinafter referred to as a supporting ratio of the partially crosslinked adhesive. For example, when the porous film supports the partially crosslinked adhesive on the whole of one surface thereof, the supporting ratio on that surface is 100%. For example, when the porous film supports the partially crosslinked adhesive in the ribbed or spotted form on the front and back surfaces thereof, and the proportion of supporting the partially crosslinked adhesive is 50% of the area of each of the front and back surfaces thereof, the supporting ratio is 50% in each of the front and back surfaces.

Thus, it is preferable that the partially crosslinked adhesive is supported on the surface of the porous film substrate in a supporting ratio in the range of from 5 to 95%, more preferably from 10 to 90%, and most preferably from 20 to 80%.

By partially providing a layer of the partially crosslinked adhesive on the porous film substrate, it is possible to obtain firm bonding between the electrode and the porous film (separator) in an ultimately obtained battery while ensuring ionic permeability and enlarging the thickness of the partially crosslinked adhesive layer to 0.5 µm or more.

As described above, the partially crosslinked adhesive is supported on the porous film substrate to form a partially crosslinked adhesive-supported porous film for battery separator, to which is then laid, contact bonded and laminated an electrode, to obtain an electrode/porous film laminate.

A negative electrode and a positive electrode vary depending upon the battery. However, in general, sheet-like electrodes prepared by supporting an active substance and optionally, a conductive agent on a conductive substrate using a resin binder are used.

By using such an electrode/porous film laminate, it is possible to produce a battery without causing mutual slip movement between the electrode and the separator and with good efficiency, and it is possible to obtain a battery in which after producing a battery, the porous film functions itself as a separator.

According to the present invention, a method may be employed in which the partially crosslinked adhesive is supported on both of the front and back surfaces of the porous film substrate, and electrodes, i.e., a negative electrode and a positive electrode, are contact bonded, temporarily bonded and laminated on each of the front and back surface of the porous film substrate to form an electrode/porous film laminate. A method may also be employed in which the partially crosslinked adhesive is supported on only one surface of the porous film substrate, and an electrode, i.e., either one of a negative electrode or a positive electrode, is contact bonded, temporarily bonded and laminated on that surface to form an electrode/porous film laminate. As a matter of course, a laminate having a construction of positive (or negative) electrode/porous film/negative (or positive) electrode/porous film may be formed.

The electrode/porous film laminate according to the present invention can be suitably used for the production of batteries. That is, the electrode/porous film laminate is charged into a battery container, and an electrolyte liquid having a polyfunctional compound dissolved therein is poured into the battery container and reacted with the unreacted functional group of the reactive polymer in the partially crosslinked adhesive in the electrode/porous film laminate to further crosslink the reactive polymer, whereby the electrode is bonded to and integrated with the porous film. Thus, it is possible to obtain a battery having an electrode/separator junction body in which not only the porous film functions as a separator, but also this separate is firmly bonded to the electrode.

The proportion of the polyfunctional compound in the electrolytic liquid is usually in the range of from 0.1 to 20 parts by weight based on 100 parts by weight of the reactive polymer supported on the porous film. When the proportion of the polyfunctional compound is less than 0.1 parts by weight based on 100 parts by weight of the reactive polymer supported on the porous film, crosslinking of the reactive polymer with the polyfunctional compound is insufficient, and in the resulting electrode/separator junction body, it is impossible to obtain firm bonding between the electrode and the separator. On the other hand, when the proportion of the polyfunctional compound is more than 20 parts by weight based on 100 parts by weight of the reactive polymer, the adhesive after crosslinking is too hard so that adhesiveness between the separator and the electrode may possibly be hindered.

Thus, according to the present invention, the partially crosslinked adhesive prepared by partially crosslinking the reactive polymer in advance is supported on the porous film; the electrode is laid on the surface; a pressure is applied to the porous film while heating at a temperature at which deformation or the like is not caused, and preferably, a part of the partially crosslinked adhesive is press fitted into the electrode, thereby temporarily bonding the porous film substrate to the electrode in a sense, to form an electrode/porous film laminate; thereafter, the laminate is charged into a battery container; and an electrolytic liquid having a polyfunctional compound dissolved therein is poured into the battery container and reacted with the unreacted functional group of the reactive polymer in the partially crosslinked adhesive, thereby further crosslinking the reactive polymer to obtain an electrode/porous film junction body. Accordingly, in such an electrode/porous film junction body, the electrode is firmly bonded to the porous film.

The porous film in the thus obtained electrode/porous film junction body is put in a battery and then functions as a separator. In the electrode/porous film junction body, the porous film (namely, the separator) has a low area heat shrinkage factor of usually 20% or less, and preferably 15% or less, even at high temperatures.

Likewise the electrode/porous film laminate described above, the electrode/separator junction body includes not only a negative electrode/separator/positive electrode junction body but also a junction body of either one electrode of a negative electrode or a positive electrode and a separator and a construction of positive (or negative) electrode/separator/negative (or a positive) electrode/separator.

The electrolyte liquid is a solution comprising an electrolyte salt dissolved in a solvent. Examples of the electrolyte salt that can be used include salts comprising hydrogen, an alkali metal (such as lithium, sodium, and potassium), an alkaline earth metal (such as calcium and strontium), or a tertiary or quaternary ammonium salt as a cation component; and an inorganic acid (such as hydrochloric acid, nitric acid, phosphoric acid, sulfuric acid, tetrafluoroboric acid, hydrofluoric acid, hexafluorophosphoric acid, and perchloric acid) or an organic acid (such as organic carboxylic acids, organic sulfonic acids, and fluorine-substituted organic sulfonic acids) as an anion component. However, of these electrolyte salts, those comprising an alkali metal ion as a cation component are especially preferably used.

As the solvent of the electrolyte liquid, any solvent capable of dissolving the electrolyte salts therein can be used. Examples of non-aqueous solvents include cyclic esters such as ethylene carbonate, propylene carbonate, butylene carbonate, and γ-butyrolactone; ethers such as tetrahydrofuran and dimethoxyethane; and chain esters such as dimethyl carbonate, diethyl carbonate, and ethyl methyl carbonate. These solvents are used alone or as mixtures of two or more thereof.

The present invention will be described in more detail by reference to the following Examples, but it should be understood that the invention is not construed as being limited thereto.

REFERENCE EXAMPLE 1

Preparation of Reactive Polymer

A monomer mixture solution of 45 parts by weight of N,N-dimethyl acrylamide, 38 parts by weight of butyl acrylate, 15 parts acrylonitrile, and 2 parts by weight of 2-hydroxyethyl acrylate along with 0.2 parts by weight of azobisisobutyronitrile dissolved in 150 parts by weight of ethyl acetate was charged in a four-necked flask equipped with a stirrer, a nitrogen introduction tube, and a condenser, and the inside of the flask was displaced with nitrogen while stirring. The mixture was polymerized in a warm water bath at 60° C. for 24 hours while stirring, and after raising the temperature at 75° C., the resulting mixture was further polymerized at this temperature for 4 hours. Ethyl acetate was added to the reaction mixture to obtain an acrylic polymer adhesive solution having a concentration of 25% by weight. This reactive polymer had a glass transition temperature of 48° C.

The glass transition temperature of the reactive polymer was measured in the following manner (hereinafter the same). That is, the solution of the reactive polymer was cast on release paper and dried to obtain a sheet having a thickness of from 0.2 to 0.5 mm and a width of 5 mm. Using DSM120 manufactured by Seiko Instruments Inc., this sheet was measured for storage elastic modulus (E') and loss elastic modulus (E") at a bending mode of 10 Hz with a distance between chucks of 10 mm, and a peak temperature of tan δ (E"/E') was defined as the glass transition temperature.

REFERENCE EXAMPLE 2

Preparation of Reactive Polymer

A solution of a reactive polymer having a concentration of 25% by weight was obtained in the same manner as in Reference Example 1, except for using a monomer mixture solution consisting of 35 parts by weight of N-acryloylmorpholine, 48 parts by weight of butyl acrylate, 15 parts by weight of acrylonitrile, and 2 parts by weight of 2-hydroxyethyl acrylate along with 0.2 parts by weight of azobisisobutyronitrile dissolved in 150 parts by weight of ethyl acetate. This reactive polymer had a glass transition temperature of 42° C.

REFERENCE EXAMPLE 3

Preparation of Reactive Polymer

Using 41 parts by weight of butyl acrylate, 41 parts by weight of methyl methacrylate, 15 parts by weight of acrylonitrile, 2 parts by weight of 2-hydroxyethyl acrylate, 0.1 parts by weight of lauryl mercaptan, and 3 parts by weight of a nonionic surfactant, emulsion polymerization was carried out according to the conventional manner. To the resulting reactive polymer aqueous dispersion, 10% hydrochloric acid was added to precipitate the reactive polymer. The precipitate was taken out, thoroughly washed with water, and then dried in vacuum. The thus obtained reactive polymer was dissolved in ethyl acetate to obtain a solution of the reactive polymer having a concentration of 25% by weight. This reactive polymer had a glass transition temperature of 34° C.

REFERENCE EXAMPLE 4

Preparation of Reactive Polymer

Using 41 parts by weight of butyl acrylate, 41 parts by weight of methyl methacrylate, 15 parts by weight of acrylonitrile, 3 parts by weight of methacrylic acid, 0.1 parts by weight of lauryl mercaptan, and 3 parts by weight of an anionic surfactant, emulsion polymerization was carried out in water according to the conventional manner. To the resulting reactive polymer aqueous dispersion, 10% hydrochloric acid was added to precipitate the reactive polymer. The precipitate was taken out, thoroughly washed with water, and then dried in vacuum. The thus obtained reactive polymer was dissolved in ethyl acetate to obtain a solution of the reactive polymer having a concentration of 25% by weight. This reactive polymer had a glass transition temperature of 36° C.

REFERENCE EXAMPLE 5

Preparation of Reactive Polymer

A solution of a reactive polymer having a concentration of 25% by weight was obtained in the same manner as in Reference Example 1, except for using a monomer mixture solution consisting of 65 parts by weight of N,N-diethyl acrylamide, 32 parts by weight of butyl acrylate, and 3 parts by weight of 4-hydroxybutyl acrylate along with 0.2 parts by weight of azobisisobutyronitrile dissolved in 150 parts by weight of ethyl acetate. This reactive polymer had a glass transition temperature of 36° C.

REFERENCE EXAMPLE 6

Preparation of Reactive Polymer

Using 10 parts by weight of acrylonitrile, 5 parts by weight of methacrylic acid, 30 parts by weight of butyl acrylate, 60 parts by weight of ethyl acrylate, 3 parts by weight of a polyethylene glycol alkylphenyl ether, 0.08 parts by weight of n-dodecyl mercaptan, 0.3 parts by weight of potassium persulfate, and 300 parts by weight of ion exchange water, emulsion polymerization was carried out to obtain a reactive polymer aqueous dispersion. To the resulting reactive polymer aqueous dispersion, 10% hydrochloric acid was added to precipitate the reactive polymer. The precipitate was taken out, thoroughly washed with water, and then dried in vacuum. This reactive polymer had a weight average molecular weight of about 850,000 and a glass transition temperature of −13° C. The thus obtained reactive polymer was dissolved in a mixed solvent of toluene and methyl ethyl ketone (weight ratio: 75/25) to prepare a solution of the reactive polymer having a concentration of 7%.

REFERENCE EXAMPLE 7

Preparation of Reactive Polymer

Using 40 parts by weight of acrylonitrile, 2 parts by weight of 2-hydroxyethyl acrylate, 10 parts by weight of methyl methacrylate, 50 parts by weight of 2-ethylhexyl acrylate, 0.3 parts by weight of azobisisobutyronitrile, and 300 parts by weight of toluene, solution polymerization was carried out according to the customary manner to obtain a solution of a reactive polymer in toluene. This reactive polymer had a weight average molecular weight of about 300,000 and a glass transition temperature of 5° C.

EXAMPLE 1

Preparation of Partially Crosslinked Adhesive-Supported Porous Film

To 100 g of the reactive polymer solution obtained in Reference Example 1, 0.8 g of a trifunctional isocyanate comprising 3 parts by mole of hexamethylene diisocyanate having 1 part by weight of trimethylolpropane added thereto (hereinafter simply referred to as "trifunctional isocyanate")

was added to form a solution of a crosslinkable adhesive. This crosslinkable adhesive solution was coated in a ribbed form on a releasable film made of a stretched polypropylene film using a grooved bar (groove width: 0.1 mm, depth: 0.03 mm, gap between grooves: 0.2 mm) and dried at 50° C. for one minute to obtain a releasable film having the crosslinkable adhesive partially coated in a ribbed form thereon.

Immediately thereafter, the coated surface of the crosslinkable adhesive of this film was laminated on each of the front and back surfaces of a polyethylene resin-made porous film (thickness: 25 µm, porosity: 50%, mean pore size: 0.1 µm, hereinafter the same), and the crosslinkable adhesive was transferred in a ribbed form into each of the front and back surfaces of the polyethylene resin-made porous film in a supporting ratio of 60% and placed in a thermostat at 50° C. for 7 days to partially crosslink the reactive polymer in the crosslinkable adhesive. There was thus obtained a partially crosslinked adhesive-supported porous film having a gel fraction of 56%.

Preparation of Electrodes

Lithium cobaltate ($LiCoO_2$) having a mean particle size of 15 µm, a graphite powder and a polyvinylidene fluoride resin were mixed in a weight ratio of 85:10:5, and the mixture was added to N-methyl-2-pyrrolidone to prepare a slurry having a solids content of 15% by weight. This slurry was coated in a thickness of 200 µm on the front surface of an aluminum foil having a thickness of 20 µm and dried at 80° C. for one hour. The slurry was similarly coated in a thickness of 200 µm on the back surface of the aluminum foil and dried at 120° C. for 2 hours. The aluminum foil obtained by applying the slurry to both sides thereof and drying was passed through a roll press to prepare a positive electrode sheet having a thickness of 200 µm.

A graphite powder and a polyvinylidene fluoride resin were mixed in a weight ratio of 95:5, and the mixture was added to N-methyl-2-pyrrolidone to prepare a slurry having a solids content of 15% by weight. This slurry was coated in a thickness of 200 µm on the front surface of a copper foil having a thickness of 20 µm and dried at 80° C. for one hour. Thereafter, the slurry was similarly coated in a thickness of 200 µm on the back surface of the copper foil and dried at 120° C. for 2 hours. The resulting copper foil was passed through a roll press to prepare a negative electrode sheet having a thickness of 200 µm.

Preparation of Negative Electrode/Separator/Positive Electrode Laminate

The positive electrode sheet was laid on the front surface of the foregoing partially crosslinked adhesive-supported polyethylene resin-made porous film, and the negative electrode sheet was also laid on the back surface thereof. The assembly was heated and pressurized at a temperature of 80° C. under a pressure of 5 kg/cm$^2$ for 5 minutes, thereby contact bonding and temporarily bonding the positive and negative electrode sheets to the partially crosslinked adhesive-supported polyethylene resin-made porous film to obtain a negative electrode/porous film/positive electrode laminate.

Assembling of Battery

In an argon-displaced glove box, an electrolyte salt lithium hexafluorophosphate ($LiPF_6$) was dissolved in a mixed solvent of ethylene carbonate and ethyl methyl carbonate (volume ratio: 1/2) so as to have a concentration of 1.2 moles/liter, to prepare an electrolyte liquid. Further, 2 parts by weight of the trifunctional isocyanate was dissolved in 100 parts by weight of the electrolyte liquid.

The negative electrode/porous film/positive electrode laminate was charged into a 2016 size coin type battery can serving both as positive and negative electrodes, and the electrolyte liquid having the trifunctional isocyanate dissolved therein was poured into the coin type battery can, followed by sealing to prepare a semi-product. The contrivance was placed in a thermostat at a temperature of 50° C. for 7 days, thereby crosslinking the reactive polymer in the partially crosslinked adhesive supported on the porous film of the negative electrode/porous film/positive electrode laminate with the trifunctional isocyanate and bonding the positive and negative electrodes on the porous film, i.e., the separator. There was thus obtained a coin type lithium ion secondary battery having a negative electrode/porous film (separator)/positive electrode junction body.

Evaluation of Discharge Load Characteristics of Battery

The battery was subjected to charge and discharge 5 times at a rate of 0.2 CmA, charged at a rate of 0.2 CmA, and then discharged at a rate of 2.0 CmA. As a result, the battery had discharge load characteristics of 93% in terms of a ratio of the discharge capacity at a rate of 2.0 CmA to the discharge capacity at a rate of 0.2 CmA.

Evaluation of Blister Properties

After the charge and discharge test, the battery was evaluated with respect to blister properties. The blister properties of the battery as referred to herein mean a phenomenon in which the separator floats up from the electrode due to generation of bubbles in the electrolyte liquid, expansion and contraction of the electrode sheet bonded to the separator, and the like. After the charge and discharge test, the battery was broken up and evaluated by observing the separator. As a result, the battery did not cause blister.

Evaluation of Adhesion Between Separator (Porous Film) and Electrode

The positive electrode/porous film/negative electrode laminate having been punched out into a prescribed size was impregnated with the electrolyte liquid having the trifunctional isocyanate dissolved therein and put between glass sheets. In order to suppress volatilization of the electrolyte liquid, the assembly was wrapped by a fluorocarbon resin sheet, and a 50 g weight was placed thereon, followed by placing in a thermostat at a temperature of 50° C. for 7 days, thereby crosslinking and reacting the reactive polymer in the partially crosslinked adhesive supported on the porous film of the negative electrode/porous film/positive electrode laminate with the trifunctional isocyanate and bonding the positive and negative electrodes on the porous film (i.e., the separator in the battery). There was thus obtained a positive electrode/porous film/negative electrode junction body.

The thus obtained positive electrode/porous film/negative electrode junction body was cut into a width of 1 cm and dipped in the electrolyte liquid at normal temperature for 24 hours. When the electrode was released from the positive electrode/porous film/negative electrode junction body in the moistened state, the case where resistance was present was designated as "○", and the case where the electrode was released was designated as "x", respectively.

Measurement of Area Heat Shrinkage Factor and Evaluation of Separator (Porous Film)

A positive electrode/porous film/negative electrode junction body was obtained in the same manner as in the preparation for the sake of evaluation the adhesion between the separator (porous film) and the electrode. The thus obtained positive electrode/porous film/negative electrode junction body was put between glass sheets and placed in a drying machine at 150° C. for one hour as it was. The glass sheets were taken out from the positive electrode/porous film/negative electrode junction body, and the separator was released from the positive and negative electrodes and read into a scanner. An area heat shrinkage factor was determined while comparing the area of the initially used porous film. As a result, it was 5%. The results are shown in Table 1.

EXAMPLE 2

A polyethylene resin-made porous film in which a partially crosslinked adhesive having a gel fraction of 69% was supported on each of the front and back surfaces thereof in a supporting ratio of 60% was obtained in the same manner as in Example 1, except for using the reactive polymer solution prepared in Reference Example 2 in place of the reactive polymer solution prepared in Referential Example 1. Using this polyethylene resin-made porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 3

The crosslinkable adhesive solution prepared in Example 1 was uniformly coated on the whole of a releasable film made of a stretched polypropylene film and dried at 50° C. for one minute to obtain a releasable film having the crosslinkable adhesive uniformly coated on the whole thereof.

Immediately thereafter, the coated surface of the crosslinkable adhesive of this film was laminated on each of the front and back surfaces of a polyethylene resin-made porous film, and the crosslinkable adhesive was uniformly transferred into the whole of each of the front and back surfaces of the polyethylene resin-made porous film and placed in a thermostat at 50° C. for 7 days to partially crosslink the reactive polymer in the crosslinkable adhesive. There was thus obtained a porous film in which a partially crosslinked adhesive having a gel fraction of 56% was supported on each of the front and back surfaces thereof in a supporting ratio of 100%.

Using this partially crosslinked adhesive-supported porous film, a coin type lithium ion secondary batter having a negative electrode/porous film (separator)/positive electrode junction body was obtained in the same manner as in Example 1. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 4

To the reactive polymer solution obtained in Reference Example 1, a silica sand powder having a mean particle size of 12 nm was added as a filler in an amount of 5 parts by weight based on 100 parts by weight of the solids of the reactive polymer and uniformly dispersed therein. A porous film in which a partially crosslinked adhesive having a gel fraction of 61% was supported thereon in a supporting ratio of 50% was obtained in the same manner as in Example 1, except for using the filler-compounded reactive polymer solution, from which was then obtained a coin type lithium ion secondary batter having a negative electrode/porous film (separator)/positive electrode junction body. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 5

A porous film in which a partially crosslinked adhesive having a gel fraction of 50% was supported thereon in a supporting ratio of 60% was obtained in the same manner as in Example 1, except for using the reactive polymer solution prepared in Reference Example 3 in place of the reactive polymer solution prepared in Reference Example 1. Using this porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 6

To 100 g of the reactive polymer solution prepared in Reference Example 3, 0.4 g of the trifunctional isocyanate was added to form a solution of a crosslinkable adhesive. A polyethylene resin-made porous film in which a partially crosslinked adhesive having a gel fraction of 37% was supported on each of the front and back surfaces thereof in a supporting ratio of 60% was obtained in the same manner as in Example 1. Using this polyethylene resin-made porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 7

To 100 g of the reactive polymer solution prepared in Reference Example 3, 4.8 g of the trifunctional isocyanate was added to form a solution of a crosslinkable adhesive. A polyethylene resin-made porous film in which a partially crosslinked adhesive having a gel fraction of 85% was supported on each of the front and back surfaces thereof in a supporting ratio of 60% was obtained in the same manner as in Example 1. Using this polyethylene resin-made porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 8

A solution of a crosslinkable adhesive was obtained in the same manner as in Example 1, except for using 100 g of the reactive polymer solution obtained in Reference Example 4 in place of the reactive polymer solution obtained in Reference Example 1 and adding thereto 0.4 g of a tetrafunctional epoxy compound made of N,N,N',N'-tetra-glycidyl-m-xylenediamine in place of the trifunctional isocyanate.

Using the this crosslinkable adhesive solution, a porous film in which a partially crosslinked adhesive having a gel fraction of 52% was supported thereon in a supporting ratio of 60% was obtained in the same manner as in Example 1. Using this porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 1.

EXAMPLE 9

A porous film in which a partially crosslinked adhesive having a gel fraction of 50% was supported thereon in a supporting ratio of 60% was obtained in the same manner as in Example 1, except for using the reactive polymer solution prepared in Reference Example 5 in place of the reactive polymer solution prepared in Reference Example 1. Using this porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 10

A polyester adhesive (Vylon 200 manufactured by Toyobo Co., Ltd., hydroxyl value: 6 mg KOH/g, glass transition temperature: 65° C.) was dissolved in a mixed solvent of toluene and methyl ethyl ketone so as to have a concentration of 25% by weight, and 0.8 g of the trifunctional isocyanate was added to 100 g of the resulting solution to prepare a crosslinkable adhesive. Using this crosslinkable adhesive, a polyethylene resin-made porous film in which a partially crosslinked adhesive having a gel fraction of 54% was supported on each of the front and back surfaces thereof in a supporting ratio of 60% was obtained in the same manner as in Example 1. Using this polyethylene resin-made porous film, a coin type lithium ion secondary batter having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 11

To 100 g of the reactive polymer solution obtained in Reference Example 6, a silica sand powder having a mean particle size of 12 nm was added as a filler in an amount of 5 parts by weight based on 100 parts by weight of the solids of the reactive polymer and uniformly dispersed therein. The dispersion was compounded with 0.3 parts by weight of the trifunctional isocyanate to prepare a solution of a crosslinkable adhesive.

This crosslinkable adhesive solution was coated on the whole of release paper using a wire bar (wire diameter: 0.2 mm) and dried. Using this, the crosslinkable adhesive was transferred onto each of the front and back surfaces of a polyethylene resin-made porous film. This porous film was placed in a thermostat at 50° C. for 7 days to obtain a porous film in which a partially crosslinked adhesive having a gel fraction of 42% was supported on each of the front and back surfaces thereof in a supporting ratio of 100%. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 12

A porous film in which a partially crosslinked adhesive having a gel fraction of 42% was supported on each of the front and back surfaces thereof in a supporting ratio of 50% was obtained in Example 1, except that in Example 11, the crosslinkable adhesive solution was coated in a ribbed form on each of the front and back surfaces of the polyethylene-made porous film using a grooved bar.

Using the thus obtained partially crosslinked adhesive-supported polyethylene resin-made porous film, a negative electrode/separator/positive electrode laminate was obtained in the same manner as in Example 1. Using this negative electrode/separator/positive electrode laminate, a coin type lithium ion secondary battery was assembled in the same manner as in Example 1. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 13

A porous film in which a partially crosslinked adhesive having a gel fraction of 42% was supported on each of the front and back surfaces thereof in a supporting ratio of 50% was obtained in Example 1, except that in Example 11, the crosslinkable adhesive solution was coated in a ribbed form on each of the front and back surfaces of the polyethylene-made porous film using a grooved bar. On the other hand, an electrolyte liquid was prepared in the same manner as in Example 1, except for using 2 parts by weight of diphenylmethane diisocyanate in place of the trifunctional isocyanate.

A coin type lithium ion secondary battery was assembled in the same manner as in Example 1, except for using the foregoing partially crosslinked adhesive-supported porous film and the electrolyte liquid. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 14

To the reactive polymer solution obtained in Reference Example 7, the trifunctional isocyanate was added in an amount of 1.0 part by weight based on 100 parts of the solids of reactive polymer solution, to prepare a solution of a crosslinkable adhesive. This crosslinkable adhesive solution was coated in a spotted form on a release film made of a stretched polypropylene resin film and dried. This was laminated on each of the front and back surfaces of a polyethylene resin-made porous film and contact bonded thereto under pressure while heating at a temperature of 60° C., followed by placing in a thermostat at a temperature of 50° C. for 7 days. There was thus obtained a porous film having a releasable stretched polypropylene film on each of the front and back surfaces thereof, in which a partially crosslinked adhesive having a gel fraction of 55% was supported on each of the front and back surfaces thereof in a supporting ratio of 60%.

After releasing the releasable stretched polypropylene film from the partially crosslinked adhesive-supported porous sheet, the positive electrode sheet was laid on the front surface of the resulting partially crosslinked adhesive-supported porous film, and the negative electrode sheet was also laid on the back surface thereof. The assembly was heated and pressurized at a temperature of 80° C. under a pressure of 5 kg/cm², thereby contact bonding and temporarily bonding the positive and negative electrode sheets to the porous film to obtain a negative electrode/porous film/positive electrode laminate.

Using the thus obtained negative electrode/porous film/positive electrode laminate, a coin type lithium ion secondary battery was assembled in the same manner as in Example 1. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 15

One part by weight of the triisocyanate and 60 parts by weight of an acrylic modified fluorocarbon resin varnish (Cefral Coat FG730B manufactured by Central Glass Co., Ltd., hydroxyl value: 8 mg KOH/g, weight average molecular weight: about 200,000, glass transition temperature of coated film: 75° C.) were dissolved in 20 parts by weight of toluene to prepare a solution of a crosslinkable adhesive.

The crosslinkable adhesive solution was coated in a ribbed form on each of the front and back surfaces of a polyethylene resin-made porous film, and the resulting porous film was placed in a thermostat at a temperature of 50° C. for 7 days to obtain a porous film in which a partially crosslinked adhesive having a gel fraction of 40% was supported on each of the front and back surfaces thereof in a supporting ratio of 60%.

Using the thus obtained partially crosslinked adhesive-supported polyethylene resin-made porous film, a negative electrode/separator/positive electrode laminate was obtained in the same manner as in Example 1. Using this negative electrode/separator/positive electrode laminate, a coin type lithium ion secondary battery was assembled in the same manner as in Example 1. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

EXAMPLE 16

A porous film in which a partially crosslinked adhesive having a gel fraction of 17% was supported on each of the front and back surfaces thereof in a supporting ratio of 60% was obtained in the same manner as in Example 1, except that in Example 1, a solution of a crosslinkable adhesive prepared by adding 0.2 g of the trifunctional isocyanate to 100 g of the reactive polymer solution prepared in Reference Example 3 was used. Using this porous film, a coin type lithium ion secondary battery having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 2.

COMPARATIVE EXAMPLE 1

In Example 1, the reactive polymer solution obtained in Reference Example 1 was used as a solution of an adhesive as it was without adding the trifunctional isocyanate thereto and supported on each of the front and back surfaces of a polyethylene resin-made porous film in a supporting ratio of 60% in the same manner as in Example 1. Using the thus obtained adhesive-supported porous film, a coin type lithium ion secondary battery having a negative electrode/porous film (separator)/positive electrode laminate was obtained in the same manner as in Example 1. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 3.

COMPARATIVE EXAMPLE 2

In Example 1, a polyethylene resin film not supporting a partially crosslinked adhesive thereon was used as it was in place of the partially crosslinked adhesive-supported porous film. That is, the positive electrode sheet was laid on the front surface of the polyethylene resin film, and the foregoing negative electrode sheet was laid on the back surface thereof, to form a negative electrode/porous film/positive electrode laminate without temporarily bonding the electrode sheets.

This negative electrode/porous film/positive electrode laminate was charged into a 2016 size coin type battery can serving both as positive and negative electrodes, and the electrolyte liquid was poured into the coin type battery can, followed by sealing to prepare a coin type lithium ion secondary battery. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 3.

COMPARATIVE EXAMPLE 3

A coin type lithium ion secondary battery was prepared in the same manner as in Example 1, except that in Example 1, the electrolytic liquid was used as it was without dissolving a polyfunctional isocyanate. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 3.

COMPARATIVE EXAMPLE 4

A porous film in which a partially crosslinked adhesive having a gel fraction of 3% was supported thereon in a supporting ratio of 60% was obtained in the same manner as in Example 1, except for using a solution of a crosslinkable adhesive prepared by adding 0.02 g of the trifunctional isocyanate to 100 g of the reactive polymer solution prepared in Reference Example 3 in Example 1. Using this porous film, a coin type lithium ion secondary battery having a negative electrode/porous film (separator)/positive electrode junction body was obtained. This battery was evaluated in the same manner as in Example 1 with respect to the discharge load characteristics, the blister properties of battery, the adhesion between separator (porous film) and electrode, and the area heat shrinkage factor of separator (porous film). The results are shown in Table 3.

TABLE 1

|  | Example | | | | | | | |
|---|---|---|---|---|---|---|---|---|
|  | 1 | 2 | 3 | 4 | 5 | 6 | 7 | 8 |
| Partially crosslinked adhesive-supported film | | | | | | | | |
| Tg of reactive polymer [1] (° C.) | 48 | 42 | 48 | 50 | 34 | 34 | 34 | 36 |
| Supporting ratio of adhesive (%) | 60 | 60 | 100 | 50 | 60 | 60 | 60 | 60 |
| Gel fraction of adhesive (%) | 56 | 69 | 56 | 61 | 50 | 37 | 85 | 52 |
| Amount of polyfunctional compound in reactive polymer [2] (g) | 0.8 | 0.8 | 0.8 | 0.8 | 0.8 | 0.4 | 4.8 | 0.4 |
| Battery | | | | | | | | |
| Discharge load characteristics (%) | 93 | 94 | 90 | 91 | 93 | 91 | 92 | 93 |
| Adhesion | ○ | ○ | ○ | ○ | ○ | ○ | ○ | ○ |
| Heat shrinkage factor of film (%) | 5 | 12 | 0 | 3 | 8 | 12 | 15 | 5 |
| Blister properties | No | No | No | No | No | No | No | No |

[1] Reactive polymer used for preparation of partially crosslinked adhesive
[2] Amount (g) of polyfunctional compound per 100 g of reactive polymer solution used for preparation of partially crosslinked adhesive

TABLE 2

|  | Example | | | | | | | |
|---|---|---|---|---|---|---|---|---|
|  | 9 | 10 | 11 | 12 | 13 [3] | 14 | 15 | 16 |
| Partially crosslinked adhesive-supported film | | | | | | | | |
| Tg of reactive polymer [1] (° C.) | 36 | 65 | −13 | −13 | −13 | 5 | 75 | 34 |
| Supporting ratio of adhesive (%) | 60 | 60 | 100 | 50 | 50 | 60 | 60 | 60 |
| Gel fraction of adhesive (%) | 50 | 54 | 42 | 42 | 42 | 55 | 40 | 17 |
| Amount of polyfunctional compound in reactive polymer [2] (g) | 0.8 | 0.8 | 0.3 | 0.3 | 0.3 | 1.0 | 1.0 [4] | 0.2 |
| Battery | | | | | | | | |
| Discharge load characteristics (%) | 91 | 90 | 91 | 95 | 92 | 93 | 90 | 92 |
| Adhesion | ○ | ○ | ○ | ○ | ○ | ○ | ○ | ○ |
| Heat shrinkage factor of film (%) | 11 | 7 | 5 | 8 | 10 | 6 | 12 | 18 |
| Blister properties | No | No | No | No | No | No | No | No |

[1] Reactive polymer used for preparation of partially crosslinked adhesive
[2] Amount (g) of polyfunctional compound per 100 g of reactive polymer solution used for preparation of partially crosslinked adhesive
[3] An electrolyte liquid having diphenylmethane diisocyanate as the polyfunctional compound dissolved therein was used.
[4] Amount (g) of polyfunctional compound per 80 g of polymer solution made of 60 parts by weight of acrylic modified fluorocarbon resin varnish and 20 parts by weight of toluene

TABLE 3

|  | Comparative Example | | | |
|---|---|---|---|---|
|  | 1 | 2 | 3 [3] | 4 |
| Partially crosslinked adhesive-supported film | | | | |
| Tg of reactive polymer [1] (° C.) | 48 | — | 48 | 34 |
| Supporting ratio of adhesive (%) | 60 | — | 60 | 60 |
| Gel fraction of adhesive (%) | 0 | — | 56 | 3 |
| Amount of polyfunctional compound in reactive polymer [2] (g) | 0 | — | 0.8 | 0.02 |
| Battery | | | | |
| Discharge load characteristics (%) | 85 | 95 | 90 | 93 |
| Adhesion | x | x | x | x |
| Heat shrinkage factor of film (%) | 57 | 60 | 26 | 58 |
| Blister properties | Yes | Yes | Yes | Yes |

[1] Reactive polymer used for preparation of partially crosslinked adhesive
[2] Amount (g) of polyfunctional compound per 100 g of reactive polymer solution used for preparation of partially crosslinked adhesive
[3] An electrolyte liquid containing no polyfunctional compound was used.

The partially crosslinked adhesive-supported porous film for battery separator according to the invention is one comprising a porous film substrate having supported thereon a partially crosslinked adhesive that is partially crosslinked by preparing a reactive polymer having a functional group in the molecule and capable of being crosslinked upon reaction with a polyfunctional compound having reactivity with the functional group and then reacting the reactive polymer with a polyfunctional compound.

Accordingly, by laying an electrode on such a porous film and preferably upon heating under pressure, it is possible to easily temporarily bond the electrode to the porous film. Thus, in producing a battery, it is possible to use the thus formed porous film as an electrode/porous film (separator) laminate without causing slip movement between the electrode and the porous film (separator), and batteries can be produced with good efficiency.

Further, even when such a laminate is charged in a battery container, and an electrolyte liquid is poured into the battery container, temporary bonding between the electrode and the porous film (separator) is kept, and the reactive polymer in the partially crosslinked adhesive is partially crosslinked. Accordingly, dissolution of the reactive polymer into the electrolyte liquid is prevented or reduced, and in producing a battery, the reactive polymer in the partially crosslinked adhesive is further crosslinked, thereby forming an electrode/separator junction body in which the electrode is firmly and stably bonded to the porous film (separator) with good adhesiveness.

Thus, in the battery obtained according to the invention, blister does not occur, and temperature rise of the battery caused by heat generation during abnormal short circuit can be suppressed. Moreover, in the electrode/separator junction body, even when the battery is placed at high temperatures, the separator made of the porous film is low in heat shrinkage factor and hence, can contribute to safety of the battery at high temperatures.

What is claimed is:

1. A process of producing a battery, which comprises obtaining a partially crosslinked adhesive by reacting a reactive polymer with a polyfunctional compound wherein the reactive polymer has a functional group in the molecule and capable of being crosslinked upon reaction with the polyfunctional compound and the polyfunctional compound having reactivity with the functional group;

applying the partially crosslinked adhesive to a porous film substrate to obtain a partially crosslinked adhesive-supported porous film;

laminating and contact bonding an electrode on the thus obtained partially crosslinked adhesive-supported porous film to form an electrode/porous film laminate; and after charging the electrode/porous film laminate into a battery container, pouring an electrolyte liquid containing the polyfunctional compound into the battery container and heating it to react the unreacted functional group in the reactive polymer with the polyfunctional compound, thereby further crosslinking the partially crosslinked adhesive supported on the porous film and bonding the electrode to the porous film to form an electrode/porous film junction body and obtain a battery having as a separator the porous film in the electrode/porous film junction body.

* * * * *